United States Patent [19]

Thill

[11] 4,332,916

[45] Jun. 1, 1982

[54] ION EXCHANGE POLYMERS ON IMPROVED POROUS SUBSTRATES

[75] Inventor: Bruce P. Thill, Midland, Mich.

[73] Assignee: The Dow Chemical Company, Midland, Mich.

[21] Appl. No.: 299,371

[22] Filed: Sep. 21, 1972

[51] Int. Cl.$^3$ .............................................. C08B 16/00
[52] U.S. Cl. ....................................... 521/25; 521/30; 210/682; 210/688; 252/631; 423/2
[58] Field of Search ...................... 106/168; 260/2.2 R, 260/231, 219; 521/25, 30; 536/57; 425/2; 210/682, 688; 252/631

[56] References Cited

U.S. PATENT DOCUMENTS

| | | | |
|---|---|---|---|
| 2,610,953 | 9/1952 | Daul et al. | 260/2.2 R |
| 2,927,034 | 3/1960 | Chih | 106/168 X |
| 3,057,745 | 10/1962 | Meador | 106/168 X |
| 3,110,602 | 11/1963 | Politzer et al. | 106/168 X |
| 3,122,456 | 2/1964 | Meier et al. | 260/2.2 R X |
| 3,573,277 | 3/1971 | Grant | 260/231 |
| 3,586,646 | 6/1971 | Corte et al. | 260/2.2 R |
| 3,652,540 | 3/1972 | Determann et al. | 521/25 |

Primary Examiner—Deborah L. Kyle

[57] ABSTRACT

Increased ion exchange capacity per unit weight of substrate is achieved upon using as the substrate regenerated cellulose sponge instead of cotton fabric. A water soluble crosslinkable polymeric material having ion ion exchange sites, such as polyvinyl phosphate or polyethylenimine, and a suitable crosslinking agent are dissolved in water. The sponge is wetted with the solution and dried and cured at about 100 degrees to 145 degrees C. to crosslink the polymer to the substrate. The so-prepared ion exchange composition is immersed in a flowing stream of dilute aqueous solution of heavy metal ions or otherwise contacted with such solution to effect separation and concentration of such cations.

8 Claims, No Drawings

ION EXCHANGE POLYMERS ON IMPROVED POROUS SUBSTRATES

The invention herein described was made in the course of or under a contract with an agency of the U.S. government.

BACKGROUND OF THE INVENTION

1. Field of the Invention

The invention relates to recovery, concentration and detection of heavy metal ions from dilute aqueous solution and to methods and compositions therefor and processes of preparing the composition. The invention is particularly concerned with the preparation and use of an ion exchange composition in which a material with ion exchange sites is linked to a substrate.

2. Description of the Prior Art

Heretofore recovery of metal ions has been effected from relatively concentrated aqueous solutions, usually acidic, containing at least 50 parts per million and more usually at least 1000 parts per million or 0.1%, using ion exchange materials such as ion exchange resins, e.g., in the form of beads or granules, or cellulosic material such as cotton fabric or with material having ion exchange sites deposited in or on a porous substrate such as cotton fabric, or silica gel or gamma alumina. However, none of these is as effective as would be desired for the concentration and recovery of heavy metal ions from dilute aqueous solution for the ready detection or recovery thereof.

SUMMARY OF THE INVENTION

It has now been discovered that increased ion exchange capacity for heavy metal ions per unit weight of substrate is achieved upon using as the substrate regenerated cellulose sponge instead of cotton fabric, and crosslinking thereto a water soluble crosslinkable polymeric material having ion exchange sites, such as polyvinyl phosphate or polyethylenimine. The ion exchange composition is prepared by wetting the cellulose sponge with an aqueous solution of a crosslinking agent and the crosslinkable polymeric material, and drying and curing the sponge at about 100 to 145 degrees C. to effect crosslinking. The so-prepared composition is capable of greatly concentrating heavy metal ions from dilute aqueous solutions and finds particular utility in recovering heavy metal ions from a flowing stream such as natural waters.

DESCRIPTION OF THE INVENTION

The ion exchange composition of the invention is prepared, as indicated, from regenerated cellulose sponge and a water soluble crosslinkable polymeric material having ion exchange sites for cations as understood in the ion exchange art. Most any of the sponges made from regenerated cellulose may be used, whether or not reinforced with various fibers or filaments or backings so long as the sponge is porous and freely permeable and so long as it is made mainly of regenerated cellulose. Preferably the sponge is made entirely of regenerated cellulose. Sponges of the type referred to are generally made by admixing green viscose with size-graded fractions of granular sodium sulfate decahydrate and heating a layer of the mixture while under transverse confinement to mold and coagulate and regenerate the cellulose, while also melting away the sodium sulfate as the process progresses. On such artificial sponges specific reference is made to Meador, U.S. Pat. No. 3,057,745, issued Oct. 9, 1962.

The crosslinkable polymer used herein is any water soluble crosslinkable polymer having cation exchange sites thereon and amenable to attachment to sites on the regenerated cellulose sponge. Examples of such polymeric materials are (1) polyvinyl phosphate prepared by phosphorylating, as well understood in the art, polyvinyl alcohol having an average molecular weight of about 25,000 to 35,000 and a degree of hydrolysis of about 75 to 100 percent, although polyvinyl alcohol having an average molecular weight in the range of about 20,000 to 50,000 and a similar degree of hydrolysis is generally usable as a starting material and (2) unsubstituted polyethylenimine having an average molecular weight of at least 10,000, and preferably in the range of about 40,000 to 100,000. The polyvinyl phosphate and the polyethylenimine must each be water soluble. The highest molecular weight polyethylenimine now known to be available has an average molecular weight of about 200,000, is water soluble, and is suitable for use according to the present invention. It is confidently expected that any high molecular weight unsubstituted polyethylenimine that can be made is suitable for use in the article and method of the present invention.

In adding the crosslinkable polymer to the sponge, a piece of sponge of most any convenient size preselected to hold enough sample solution for the problem at hand is used, or chopped pieces of sponge if the metal ion recovery is to be carried out in a column. Such sponge is thoroughly wetted by an aqueous solution of the polymeric material, preferably by immersing the sponge and squeezing it until the wet pickup is about equal to the dry weight of the sponge, although a greater residual amount may be needed if the polymer solution is more dilute. Generally about a 20 to 30 percent by weight solution of the polymer is used which also contains sufficient crosslinking agent to crosslink the polymer to the active sites of the cellulose, mainly where OH groups exist in the molecule.

A suitable crosslinking agent for use with polyvinyl phosphate is urea, while a suitable crosslinking agent to use with polyethylenimine is 2-butenyl-bis[1,4-bis(2-hydroxyethyl)sulfonium chloride].

The impregnated sponge is then dried and cured to effect crosslinking at a temperature of about 100 to 145 degrees C. for about 15 to 90 minutes. The time and temperature conditions must be vigorous enough to crosslink a useful amount of polymer to the substrate sponge, but must not be so vigorous as to cause substantial thermal decomposition or degradation of the regenerated cellulose. If too little crosslinking occurs the polymeric material is too readily removable on placing the sponge in flowing water.

The ion exchange composition obtained by so impregnating, drying and curing the sponge is ready to be used in monitoring applications, though it may be desirable to rinse the sponge in water several times to remove unreacted, i.e., unattached, polymer, especially if heavy metal ions are to be recovered and not merely measured.

Once prepared as herein defined, the ion-selective compositions of this invention are contacted in any suitable manner with an aqueous solution containing the defined ions. Conveniently, the ion-selective composition is employed as a diaphragm through which such water is passed, or pieces of the prepared composition are admixed with water in a vessel. For monitoring of natural flowing waters a piece of the prepared composition is simply immersed in the water for a time.

After contact between the ion-selective composition of this invention and the ion-containing water, the solid ion-selective composition is easily separated from the aqueous phase for analysis or recovery of the metals contained therein. Since the heavy metal ions occur in a relatively concentrated state in the ion-selective composition, the process of this invention is useful to detect relatively small quantities of such ions in water, permits analysis of very dilute solutions thereof and a determination of their relative proportions and the proportions of the isotopes thereof. Likewise the process of this invention is useful to recovery of the defined ions from aqueous solutions thereof by sorbing them on the ion-selective composition and recovering them by standard elution techniques.

After contact with the cation-containing water, analysis of the treated cellulose composition by atomic absorption, mass spectrometry, radiochemical analysis or other suitable methods shows the ions have been removed from the water and the concentration of such ions, including lithium, is sufficient to enable the detection of trace amounts.

The ion exchange composition of the invention exhibits an ion exchange capacity for heavy metal ions per gram of substrate at least tenfold greater and higher than similarly treated cotton lawn fabric, although both are cellulosic materials, when using amounts of each substrate that appear to have theoretically equal ion exchange capacity as determined by aqueous acid titration according to standard techniques.

The following preparations and tests serve to illustrate the invention and not to limit the scope thereof.

EXAMPLE 1

Preparation of Poly(vinyl phosphate)

To 300 g. of water in a stirred reactor was slowly added 100 g. of poly(vinyl alcohol) (88–89% hydrolysis, viscosity 4% aqueous solution 4–6 cps. at 20° C.) and the mixture was stirred until solution was complete. The solution was heated to 95° C. to insure complete solution, cooled to 80° C. and 300 g. of 85% phosphoric acid was added followed by 175 g. of urea. The temperature was gradually increased with slow agitation to 100° C. (considerable foaming). After the foaming had subsided the solution was heated at 100°–104° C. for 1.5 hours. The solution was cooled and an additional 600 g. of water was added. A total of 1458 g. of solution was obtained.

EXAMPLE 2

Preparation of Poly(vinyl phosphate)-treated Sponge

Commercial regenerated cellulose sponge (thoroughly washed) was treated with the poly(vinyl phosphate) solution of Example 1 in the following fashion. A sponge was thoroughly soaked in a solution of 100 g. polyvinyl phosphate from Example 1, 12 g. of urea and 12 g. of water, and squeezed out to 100% wet pickup. The sponge was heated in a circulating air oven at 125° C. until the internal sponge temperature as measured by a thermocouple embedded in it reached 100° C. The oven temperature was increased to 145° C. for 20 minutes, the sponge was removed, cooled, washed and redried. A small weighed sample of the sponge was soaked in 5 N HCl for 2 hours; washed several times with deionized water until the wash water was neutral (pH-7). The sample was then cut into small pieces and titrated with 0.1 N potassium hydroxide solution, and found to have a titer of 1500 milliequivalents per kilogram (meq./kg.).

EXAMPLE 3

Preparation of Polyethylenimine-treated Sponge

To 25 g. of a 32% aqueous solution of polyethylenimine (60,000–100,000 molecular weight) was added 100 g. of water and 6.0 g. of 2-butenyl-bis[1,4-bis(2 hydroxyethyl) sulfonium chloride] crosslinker. A thoroughly washed regenerated cellulose sponge was saturated with the treating solution, squeezed out to 100% wet pickup and cured in a circulating air oven at 110° C. until the internal sponge temperature reached 100° C. for 20 minutes, washed and redried. A sample of the sponge was found by nitrogen analysis to contain 3.56% N which corresponds to 10.9% polyethylenimine content.

EXAMPLE 4

Comparison of Heavy Metal Collection Efficiency of Regenerated Cellulose Sponge vs. Cotton Fabric, Both with Poly(vinyl phosphate) Treatment Samples of poly(vinyl phosphate)-treated (1000 meq./kg. substrate by KOH titration) while lawn cotton fabric (2 sq.ft.) and regenerated cellulose sponge (6"×4"×1.5") were both submerged side-by-side in a stream containing unknown amounts of various heavy metal cations and flowing at 1.5 ft./sec. The samples remained immersed in the stream for 1000 minutes. They were then removed, weighed, and the heavy metal ion concentration, expressed as picocuries/g. of sample, was determined for each substrate by an activation analysis technique. The results are listed in Table I.

TABLE I

Poly(vinyl phosphate)-treated Substrate Comparison Test

| Randionuclide | Activity as Picocuries/g. of Substrate | |
|---|---|---|
| | Cotton Fabric | Cellulose Sponge |
| Ce-144 | 24.2 ± 2.61 | 99.8 ± 4.33 |
| Ce-141 | 0.96 ± 0.32 | 5.19 ± 0.59 |
| Cr-51 | 115 ± 11.9 | 386 ± 18.0 |
| Ru-103 | <0.27 | 1.59 ± 0.64 |
| Ru-106 | 8.32 ± 4.61 | 13.7 ± 5.54 |
| Cs-137 | 21.8 ± 2.60 | 115 ± 4.88 |
| Zr-95 | 0.92 ± 0.90 | 14.9 ± 2.64 |
| Nb-95 | 1.15 ± 0.72 | 44.9 ± 3.24 |
| Cs-134 | <2.59 | 17.3 ± 5.79 |
| Co-58 | 0.45 ± 0.44 | 2.79 ± 1.23 |
| Mn-54 | 2.83 ± 0.91 | 8.65 ± 1.33 |

I claim:

1. An improved article for concentration of heavy metal ions from dilute aqueous solution which comprises: non-woven regenerated cellulose in the form of a porous sponge with substantially all open cells, having chemically linked therewith a water soluble crosslinkable polymeric material containing cation exchange sites.

2. The article as in claim 1 in which the polymeric material is polyvinyl phosphate.

3. The article as in claim 1 in which the polymeric material is polyethylenimine.

4. The method of making an article for the concentration and collection of heavy metal ions from dilute aqueous solution which comprises:

preparing an aqueous solution of a crosslinkable water soluble polymeric material, having cation exchange capacity, and a crosslinking agent;

thoroughly wetting a porous sponge formed of regenerated cellulose with the polymer solution to provide at least 100 percent by weight pickup of the solution based on the dry weight of the sponge;

removing from the sponge polymer solution in excess of 100 percent by weight pickup;

and drying and curing the impregnated sponge at a temperature and for a time sufficient to link the polymeric material to the sponge but less than that at which substantial decomposition of the sponge occurs.

5. The method as in claim 4 in which the sponge is wetted by immersion in the polymer solution.

6. The method as in claim 4 in which the wetted sponge is dried and cured by heating the same at a temperature of about 100 to 145 degrees C. for about 15 to 90 minutes.

7. The method as in claim 4 in which the crosslinkable water soluble material is polyvinyl phosphate and the crosslinking agent is urea.

8. The method as in claim 4 in which the crosslinkable water soluble material is polyethylenimine and the crosslinking agent is 2-butenyl-bis[1,4-bis(2-hydroxyethyl)sulfonium chloride].

* * * * *

UNITED STATES PATENT AND TRADEMARK OFFICE
CERTIFICATE OF CORRECTION

PATENT NO. : 4,332,916
DATED : June 1, 1982
INVENTOR(S) : Bruce P. Thill

It is certified that error appears in the above—identified patent and that said Letters Patent is hereby corrected as shown below:

Column 4 (EXAMPLE 4), line 27, "while" should read -- white --.

Column 4 (EXAMPLE 4), TABLE I, column heading "Randionuclide" should read -- Radionuclide --.

Column 4 (EXAMPLE 4), TABLE I, following line 53, the following omitted lines of the table should be inserted:

-- Zn-65 --     -- 2.35 ± 1.90 --     -- 25.8 ± 4.12 --

-- Co-60 --     -- 4.13 ± 1.90 --     -- 37.2 ± 4.50 --

-- La-140 --    -- <1.40           -- -- 19.03 ± 12.43 --

Signed and Sealed this

Twenth-eighth Day of September 1982

[SEAL]

Attest:

Attesting Officer

GERALD J. MOSSINGHOFF

Commissioner of Patents and Trademarks